(12) United States Patent
Parry et al.

(10) Patent No.: US 10,859,400 B2
(45) Date of Patent: Dec. 8, 2020

(54) COMMUNICATION CONSOLE

(71) Applicant: Sorenson IP Holdings, LLC, Salt Lake City, UT (US)

(72) Inventors: D. Mark Parry, Salt Lake City, UT (US); Craig Nelson, Midvale, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 467 days.

(21) Appl. No.: 15/809,422

(22) Filed: Nov. 10, 2017

(65) Prior Publication Data

US 2019/0145795 A1 May 16, 2019

(51) Int. Cl.
*H04M 1/08* (2006.01)
*G01D 5/14* (2006.01)
*H01H 36/00* (2006.01)

(52) U.S. Cl.
CPC .............. *G01D 5/145* (2013.01); *H01H 36/00* (2013.01); *H04M 1/08* (2013.01)

(58) Field of Classification Search
CPC .......... G01D 5/145; H01H 36/00; H04M 1/08
USPC ........ 33/708; 324/207.2; 358/1.15; 379/395, 379/424, 427, 433.06, 437, 455, 377, 435; 439/21; 455/462
See application file for complete search history.

(56) References Cited

U.S. PATENT DOCUMENTS

| | | | | |
|---|---|---|---|---|
| 3,558,832 A | * | 1/1971 | Bonis ...................... | H04M 1/08 379/424 |
| 4,188,512 A | * | 2/1980 | Lord ....................... | H04M 1/08 379/427 |
| 4,517,419 A | * | 5/1985 | Kosten .................... | H04M 1/08 200/241 |
| 4,556,763 A | * | 12/1985 | Dragunevicius ........ | H04M 1/08 379/424 |
| 4,674,120 A | * | 6/1987 | Heldenbrand .......... | H04M 1/08 379/427 |

(Continued)

FOREIGN PATENT DOCUMENTS

| | | |
|---|---|---|
| DE | 19958767 A | 6/2001 |
| IN | KOL-2014-00986 | 4/2016 |

(Continued)

OTHER PUBLICATIONS

Off Hook Switching for Telephone Sets, Meder Electronic, www.meder.com, accessed Jul. 2017.

(Continued)

*Primary Examiner* — Gerald Gauthier
(74) *Attorney, Agent, or Firm* — Maschoff Brennan (57) ABSTRACT

A communication console may include a moveable plunger including a body and an arm. The arm may connect to and extend away from the body. A first element may be coupled to the arm. The first element may include a top point and a bottom point, the axis of displacement extending between the top point and the bottom point. The first element may move with the arm along the axis of displacement. A second element may be detached from the arm and positioned adjacent to the axis of displacement. Additionally, one of the first element or the second element may be a sensing element and another may be a detectable element. The sensing element may sense a spatial position of the detectable element and output an indication of a position of the plunger based on the spatial position of the detectable element.

15 Claims, 8 Drawing Sheets

(56) References Cited

U.S. PATENT DOCUMENTS

| | | | | |
|---|---|---|---|---|
| 4,773,088 | A * | 9/1988 | Matheny | H03G 3/04 |
| | | | | 379/395 |
| 4,790,008 | A * | 12/1988 | Bohannon | H04M 1/08 |
| | | | | 379/424 |
| 5,109,412 | A * | 4/1992 | Hollowed | H04M 1/11 |
| | | | | 379/143 |
| 5,128,994 | A | 7/1992 | Hattori et al. | |
| 5,699,425 | A * | 12/1997 | Chambers | H04M 1/667 |
| | | | | 379/437 |
| 5,732,355 | A * | 3/1998 | Lipp | H04M 1/6545 |
| | | | | 379/448 |
| 6,041,119 | A * | 3/2000 | Kato | H04M 1/08 |
| | | | | 379/424 |
| 6,289,100 | B1 * | 9/2001 | Ritter | H04M 1/10 |
| | | | | 379/424 |
| 2004/0226183 | A1 * | 11/2004 | Sielemann | F15B 15/2861 |
| | | | | 33/708 |
| 2006/0072742 | A1 | 4/2006 | Seay et al. | |
| 2006/0104435 | A1 * | 5/2006 | Seo | H03K 17/955 |
| | | | | 379/377 |
| 2006/0105588 | A1 * | 5/2006 | Seay | H04M 1/0297 |
| | | | | 439/21 |
| 2007/0121932 | A1 | 5/2007 | Seay et al. | |
| 2009/0015243 | A1 * | 1/2009 | Asa | F15B 15/2892 |
| | | | | 324/207.2 |
| 2009/0175439 | A1 * | 7/2009 | Jian | H04M 1/6033 |
| | | | | 379/433.06 |
| 2010/0157360 | A1 * | 6/2010 | Lee | H04M 11/064 |
| | | | | 358/1.15 |
| 2014/0105380 | A1 | 4/2014 | Cheng | |
| 2017/0134544 | A1 | 5/2017 | Yang et al. | |
| 2019/0145795 | A1 * | 5/2019 | Parry | H01H 36/00 |
| | | | | 324/207.2 |

FOREIGN PATENT DOCUMENTS

| | | |
|---|---|---|
| JP | H06252992 | 9/1994 |
| JP | H089008 | 1/1996 |
| JP | 2005167400 | 6/2005 |
| JP | 2006081017 | 3/2006 |

OTHER PUBLICATIONS

Cradle the Phone, Jul. 26, 2017, accessed from www7.dict.cc/wp_examples.php?Ip_id=1&lang=en&s=to cradle the phone, on Nov. 10, 2017.

* cited by examiner

COMMUNICATION CONSOLE

FIELD

The application relates generally to communication consoles.

BACKGROUND

In communication consoles, a plunger may interact with a handset to determine whether a status of the communication console is on-hook or off-hook. When the handset is interacting with the plunger, the plunger may indicate that the communication console is on-hook. When the handset is not interacting with the plunger, the plunger may indicate that the communication console is off-hook.

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments of the disclosure discuss a communication console. The communication console includes a moveable plunger including a body and an arm. The arm may be connected to and extends away from the body. The communication console further may include a first element physically coupled to the arm. The first element may include a top point on a top surface of the first element, a bottom point on an opposing bottom surface of the first element, and an axis of displacement extending between the top point and the bottom point. The first element may be configured to move with the arm along the axis of displacement. The communication console further may include a second element physically detached from the arm and positioned adjacent to the axis of displacement. Also disclosed with respect to the communication console, one of the first element or the second element may be a sensing element and another is a detectable element. The sensing element may be configured to sense a spatial position of the detectable element and output an indication of a position of the plunger based on the spatial position of the detectable element.

BRIEF DESCRIPTION OF THE DRAWINGS

Example embodiments will be described and explained with additional specificity and detail through the use of the accompanying drawings in which.

DESCRIPTION OF EMBODIMENTS

Communication consoles may indicate a status of on-hook or off-hook. In some communication consoles, a status of the communication console may be determined based on a positioning of a plunger of the communication console interacting with a handset. For example, the plunger may move in response to a weight of the handset when the handset is resting on the communication console. Other various factors may contribute to responsiveness, reliability, and/or functionality of a plunger with respect to indicating a status of a handset. Various embodiments as described in this disclosure may affect responsiveness, reliability, and/or functionality of a plunger.

Some embodiments described in this disclosure may include a communication console with a handset that may interact with a plunger. For example, in response to the handset being placed on the communication console, the handset may contact the body of the plunger. In these and other embodiments, a portion of the body of plunger that may be partially positioned outside of a housing of the communication console may be contacted by the handset. Thus, in some embodiments, the body of the plunger may be pushed into the housing in response to the handset being placed onto the communication console.

In some embodiments, the body may be attached to an arm inside the housing of the communication console. In response to the body being pushed into the housing by the handset, the arm may also move inside the communication console. Additionally or alternatively, the arm may be attached to a detectable element. In these or other embodiments, the detectable element may move with the arm in response to the handset pushing the body into the housing.

In some embodiments, a sensing element may be positioned next to the detectable element and the arm inside the housing. The sensing element may sense a position of the detectable element. Based on the position of the detectable element, a position of the arm and the body of the plunger may be determined. For example, the sensing element may include a sensory detection zone through which the detectable element is able to move. In response to the detectable element being in a position in the sensory detection zone, the sensing element may indicate to the communication console a first position of the detectable element. Based on the sensing element indicating that the detectable element is in the sensory detection zone, the communication console may determine a status for the communication console of on-hook, on receiver, or not in use.

In these or other embodiments, the arm may also move the detectable element to another position, for example, a second position, within the sensory detection zone. Based on the sensing element indicating that the detectable element is in the sensory detection zone, the communication console may determine a status for the communication console of on-hook, on receiver, or not in use.

In these or other embodiments, the arm may also move the detectable element to a position outside the sensory detection zone, for example, to a third position. Based on the sensing element indicating that the detectable element is not in the sensory detection zone, the communication console may determine a status for the communication console of off-hook, not on receiver, or is in use.

In some embodiments, the sensing element may be attached to the arm, and the detectable element positioned next to the arm. In these or other embodiments, the sensing element may perform the same or similar functions mentioned above, namely detecting a position of the detectable element relative to the sensing element. Based on the sensing element indicating that the detectable element is or is not within the sensory detection zone, the communication console may determine a corresponding status of the handset communication console.

Additionally or alternatively, example embodiments described in this disclosure may allow some movement of the body of the plunger (and, in turn, the arm of the plunger) without moving the detectable element outside the sensory detection zone. As a result, despite some movement of the plunger, for example, from the first position to the second position, the sensing element may not indicate to the communication console any change in the position of the detectable element and the communication console may not determine that the status of the handset is changed. Thus, some movement of the handset may not result in a change of status of the handset by the communication console.

Figure 1:
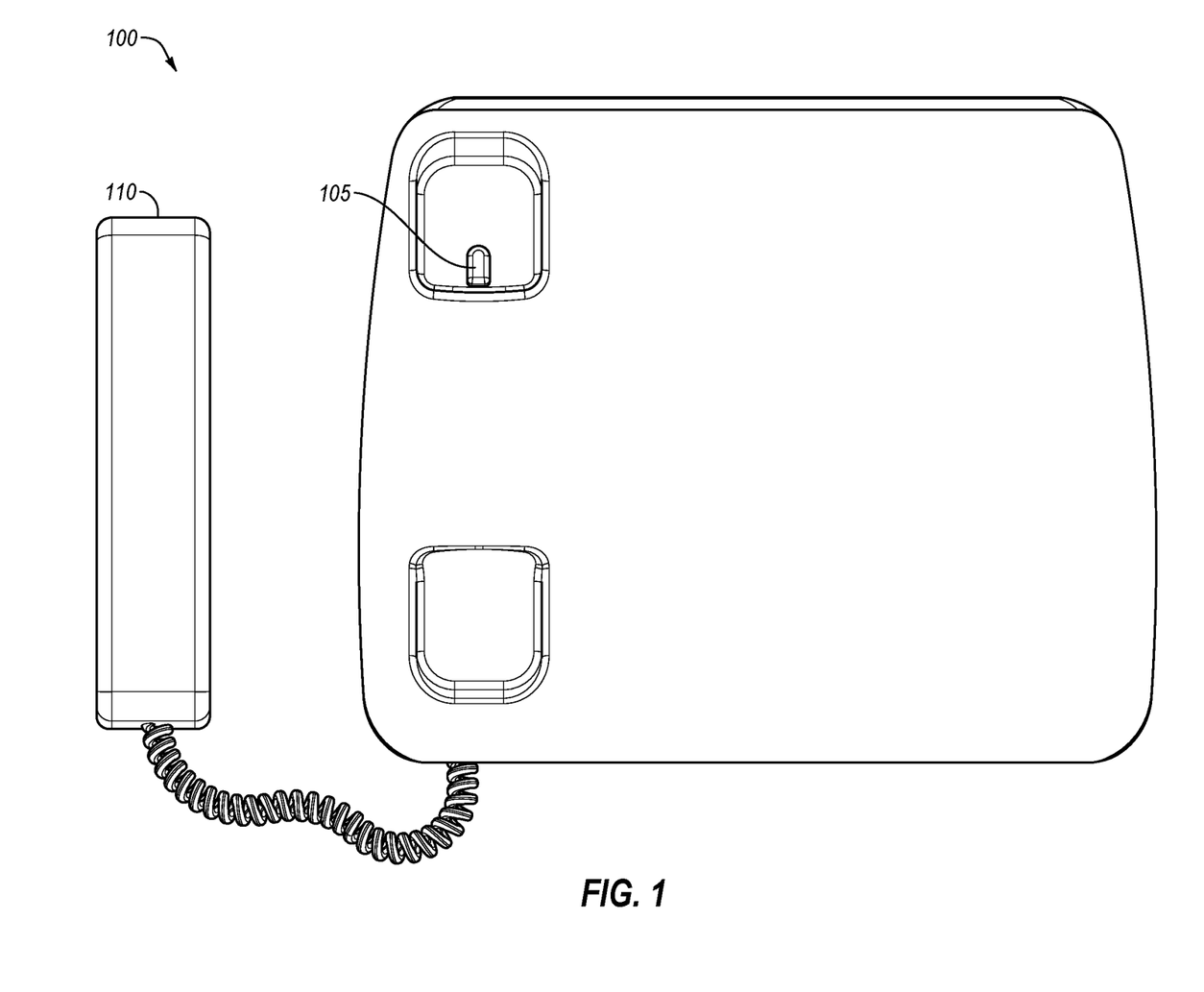
FIG. 1 illustrates an example communication console.

Turning to the figures, FIG. 1 illustrates an example communication console 100. The communication console 100 may be arranged in accordance with at least one embodiment described in the present disclosure. As illustrated, the communication console 100 may include a plunger 105 and a handset 110.

In some embodiments, the communication console 100 may be any electronic or digital computing device. For example, the communication console 100 may be a telephone, a phone console, a captioning device, a captioning telephone, or any other computing device. For example, the communication console 100 may include memory and at least one processor, which are configured to perform operations as described in this disclosure, among other operations. In some embodiments, the communication console 100 may include computer-readable instructions that are configured to be executed by the communication console 100 to perform operations described in this disclosure.

Generally, the processor may include any suitable special-purpose or general-purpose computer, computing entity, or processing device including various computer hardware or software modules and may be configured to execute instructions stored on any applicable computer-readable storage media. For example, the processor may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

It is understood that the processor may include any number of processors distributed across any number of networks or physical locations that are configured to perform individually or collectively any number of operations described herein. In some embodiments, the processor may interpret and/or execute program instructions and/or processing data stored in the memory. By interpreting and/or executing program instructions and/or process data stored in the memory, the device may perform operations, such as the operations performed by the communication console 100 of FIG. 1.

The memory may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. In these and other embodiments, the term "non-transitory" as used herein should be construed to exclude only those types of transitory media that were found to fall outside the scope of patentable subject matter in the Federal Circuit decision of In re Nuijten, 500 F.3d 1346 (Fed. Cir. 2007). In some embodiments, computer-executable instructions may include, for example, instructions and data configured to cause the processor to perform a certain operation or group of operations as described in the present disclosure.

In some embodiments, the communication console 100 may be configured to establish communication sessions with other devices. For example, the communication console 100 may be configured to establish an outgoing telephone call with another device over a telephone line or network. For example, the communication console 100 may communicate over a wireless cellular network, a plain old telephone system (POTS) line, or an internet protocol network. Alternatively or additionally, the communication console 100 may communicate over other wired or wireless networks that do not include or only partially include a POTS. For example, a telephone call or communication session between the communication console 100 and another device may be a voice-over internet protocol (VOIP) telephone call. As another example, the communication session between the communication console 100 and another device may be a video communication session, an audio communications session, or other communication session.

Additionally or alternatively, the communication console 100 may be configured to communicate with other systems over a network. In these and other embodiments, the communication console 100 may receive data from and send data to a captioning system.

The communication console 100 may be in an on-hook state or an off-hook state. In an on-hook state, the communication console 100 may be communicatively unconnected to any other device such that the communication console 100 may not be presently involved in a communication session. Alternatively or additionally, in an on-hook state, the communication console 100 may be available to participate in a communication session. In some embodiments, an on-hook state may indicate that a status of the communication console is an inactive state, a waiting state, a resting state, a sleep state, or an unused state.

In an off-hook state, the communication console 100 may be communicatively connected to any other device such that the communication console 100 may be presently involved in a communication session. Alternatively or additionally, in an off-hook state, the communication console 100 may be un-available to participate in a communication session. In some embodiments, an off-hook state may indicate that a status of the communication console is an active state, a non-resting state, a non-sleep state, or a used/in-use state.

In some embodiments, the communication console 100 may determine its current state based on user input received through a user interface. Alternatively or additionally, the communication console 100 may determine its current state based on a position of the plunger 105. For example, the plunger 105 may be depressed such that an external portion of the plunger 105 may recede into an internal portion of the communication console 100. Based on the external portion of the plunger 105 being depressed into the communication console 100, the status of the communication console 100 may be on-hook. For example, various components in the internal portion of the communication console 100 may correlate depression of the plunger 105 with the status of the communication console 100 being on-hook. For example, a first position and/or a second position of the plunger 105 may be determined by the various components in the internal portion of the communication console 100, which may result in the status of the communication console 100 being on-hook.

Additionally or alternatively, in response to the plunger 105 not being depressed, the external portion of the plunger 105 that recedes into the internal portion of the communication console 100 during the on-hook state may not be within the internal portion of the communication console 100. As a result, the status of the communication console 100 may be off-hook. For example, the various components in the internal portion of the communication console 100 may correlate non-depression of the plunger 105 with the status of the communication console 100 being off-hook. For example, a third position of the plunger 105 may be determined by the various components in the internal portion of the communication console 100, which may result in the status of the communication console 100 being off-hook. The various components in the internal portion of the communication console 100, which relate movement of the plunger 105 to the status of the communication console 100 being off-hook or on-hook, are described in greater detail later in the description.

The handset 110 may be any handset that may include a speaker, a microphone, and an electrical connector. In some embodiments, the handset 110 may include a body that houses the speaker and the microphone. In some embodiments, the handset 110 may be configured to receive electrical audio signals from the communication console 100 by way of the electrical connector and convert the electrical audio signals to acoustical audio signals using the speaker. Additionally or alternatively, the handset 110 may be configured to receive acoustical audio signals at the microphone and convert the acoustical audio signals to electrical audio signals using the microphone. The electrical audio signals may be provided to the communication console 100 by way of the electrical connector.

In some embodiments, the handset 110 may interact with the plunger 105. For example, in response to the handset 110 being placed onto the communication console 100, the handset 110 may contact the plunger 105. A weight of the handset 110 may depress the plunger 105. Additionally or alternatively, when the handset 110 is not placed onto the communication console 100, the plunger 105 may not be depressed due in part to various internal components of the communication console 100 that may apply a force to help position the plunger 105 in a non-depressed position.

In these or other embodiments, the plunger 105 may be positioned such that when the handset 110 rests upon or is otherwise positioned on the communication console 100, the plunger 105 may be depressed by the handset 110. For example, the plunger 105 may be positioned at the communication console 100 in a location also corresponding to the handset 110. In these or other embodiments, the location may be sized and shaped to receive a portion of the handset 110. For example, the location at the communication console 100 may include various cutouts, bevels, chamfers, slopes, shapes, etc. to form a designated spot for the handset 110, such as for the body of the handset 110 that may house the speaker, the microphone, etc. of the handset 110.

In these or other embodiments, a portion of the plunger 105, such as the external portion of the plunger 105, may reside in the same location of the communication console 100 as may be designated for the handset 110. Additionally or alternatively, the external portion of the plunger 105 may extend beyond a surface of the communication console 100, including outwardly from the location that may be sized and shaped to receive the portion of the handset 110, such that the external portion of the plunger 105 juts outwardly away from the communication console 100. Thus, in some embodiments, in response to the handset 110 being placed into the designated spot for the handset 110, the handset 110 may contact and depress the external portion of the plunger 105 that juts outwardly away from the communication console 100 such that the external portion of the plunger 105 may become flush with or be positioned below a housing surface of the communication console 100. In this manner, the plunger 105 may move based on the handset 110 being placed onto the plunger 105 and/or being removed off of the plunger 105.

Figure 2A:
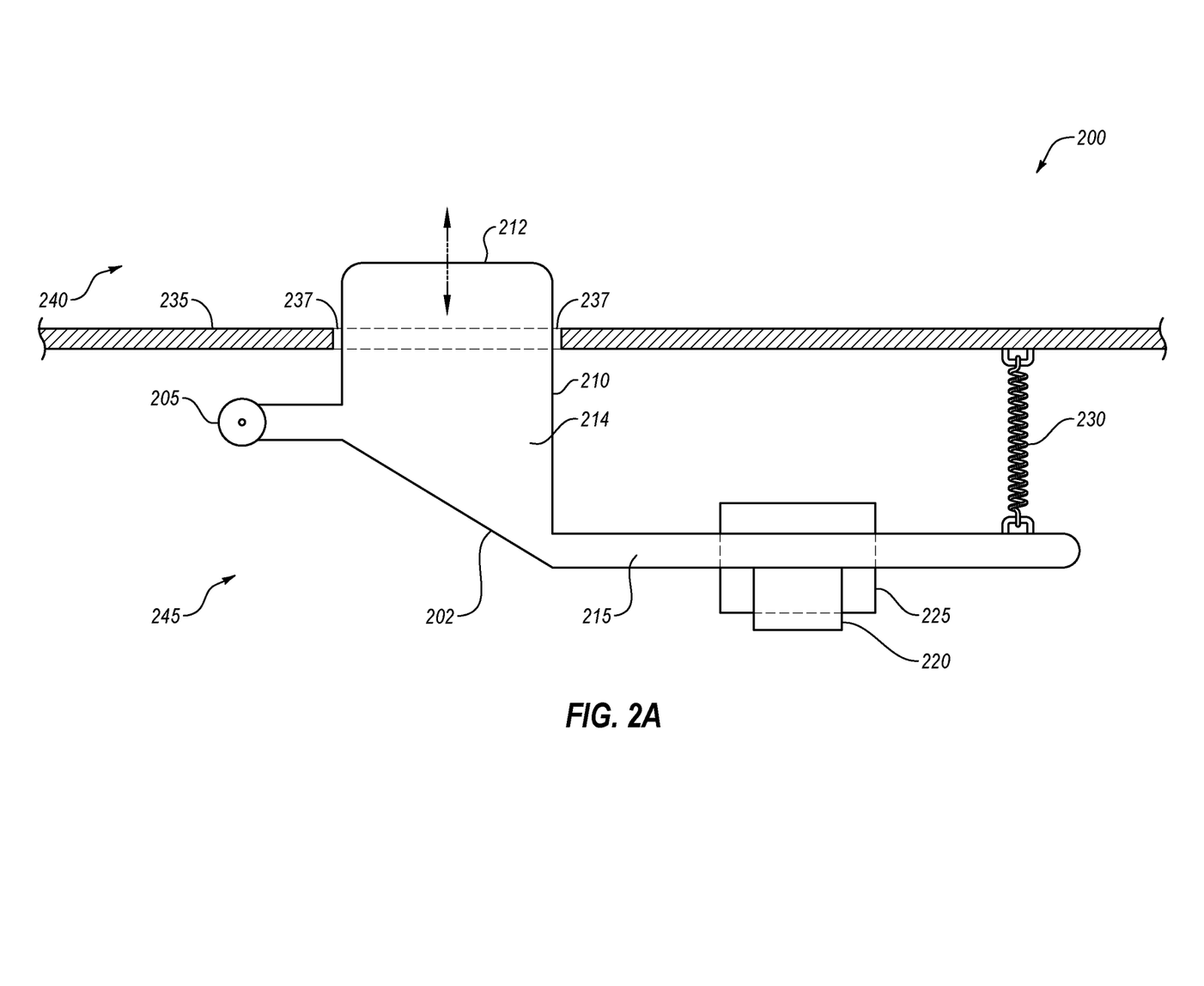
FIG. 2A illustrates an environment that includes an example plunger of a communication console.

FIG. 2A illustrates an environment 200 that includes an example plunger 202 of a communication console. The environment 200 may be arranged in accordance with at least one embodiment described in the present disclosure. In some embodiments, the plunger 202 may be an example of the plunger 105 of FIG. 1.

As illustrated, the plunger 202 may include a pivot 205, a body 210 with a first portion 212 and a second portion 214, and an arm 215. Also illustrated in the environment 200 of FIG. 2A is a first element 220, a second element 225, a spring element 230, a housing 235 with an opening 237, an external environment 240, and an internal environment 245.

In some embodiments, the first portion 212 may be sized and shaped to contact a handset. For example, the first portion 212 may be a flat, rounded, pointed, or special 3-dimensional polygon with various curvatures and faces. For example, the first portion 212 may include a surface area large enough to contact the handset, or otherwise be sufficiently large enough to be depressed by various objects or a user's finger. In these or other embodiments, the body 210 may be sufficiently long enough to extend through the hole such that the second portion 214 of the body resides in the internal environment 245 while the first portion 212 is in the external environment. For example, the body 210 may have a first side extend from the external environment 240 to the internal environment 245 to a first internal end. The pivot 205 may be connected to the first end. The first side may define a first height of the body 210. Additionally or alternatively, the body 210 may have a second side opposite the first side that extends from the external environment 240 to the internal environment 245 to a second end. The second end may be positioned further away from the housing such that the second end extends further into the internal environment 245. The arm 215 may be coupled to the body 210 at the second end. The second side may define a second height of the body 210. A distance between the first side and the second side may define a width of the body 210.

In some embodiments, the arm 215 may have a height that is less than a height of the body 210. Additionally or alternatively, the arm 215 may have a width larger than the width of the body 210. For example, the arm 215 may extend width-wise away from the body 210 in a parallel or substantially parallel manner relative to the housing 235. In these and other embodiments, the arm 215 may extend width-wise away from the body 210 in a perpendicular or substantially perpendicular manner relative to the body 210. In these or other embodiments, the arm 215 may be sized and shaped similar in appearance to a cantilever extending outward from a given point, for example, the pivot 205 or where the body 210 meets the arm 215.

The housing 235 may be a housing of a communication console, such as the communication console 100 of FIG. 1. The housing 235 may define an internal environment 245 that is separate from an external environment 240. The internal environment 245 may include components internal to the communication console that may not be visible to a user of the communication console and/or receive direct user interaction. The external environment 240 may be external to the housing 235 and may be viewed by a user of the communication console and may receive direct user interaction. The housing 235 may include an opening 237.

The body 210 of the plunger 202 may be positioned in the opening 237. In some embodiments, the opening 237 may be dimensionally configured to be similar to the dimensions of the body 210 of the plunger 202 to allow the first portion 212 of the body 210 to move through the opening 237 without contacting the opening 237.

In these or other embodiments, the body 210 may include the first portion 212 and the second portion 214. In some embodiments, the first portion 212 may be positioned in the external environment 240 when the first portion 212 is not depressed. Additionally or alternatively, the second portion 214 may be positioned in the internal environment 245 whether the body 210 is depressed or not depressed. In some embodiments, the first portion 212 may be viewable by a user and may receive user interaction, e.g., manually pushing in of the first portion 212 or placing an object such as a handset on the first portion 212. In these or other embodiments, the second portion 214 may not be viewable by a user and may not receive direct user interaction, e.g., contact by other objects. For example, the second portion 214 may be interacted with indirectly via the first portion 212.

In these or other embodiments, the second portion 214 may be coupled to the pivot 205 either directly at the first side of the body 210 or indirectly via an extension element disposed between the pivot 205 and the first side of the body 210 at the second portion 214. Additionally or alternatively, the arm 215 may be coupled directly to the second portion 214 opposite the first side of the second portion 214 at the second side of the body 210. The arm 215 may be directly or indirectly coupled to the pivot 205. For example, the arm 215 may jut outwardly from the second side of the body 210 at the second portion 214 such that the arm 215 may be aligned with the body 210 and the pivot 205. For example, the body 210 may be disposed in alignment between the pivot 205 and the arm 215, wherein each of the arm 215 and the pivot 205 may be coupled together via the body 210. In other embodiments, other positional variations of the body 210, the pivot 205, the spring element 230, and the first element 220. The other positional variations may be discussed in greater detail later in conjunction with FIG. 5.

In some embodiments, the first element 220 may be coupled to the arm 215 at a position between the second portion 214 and the spring element 230. In some embodiments, the first element 220 may be coupled to a top surface of the arm 215, the top surface of the arm 215 being closer to the housing 235 relative to a bottom surface of the arm 215. Additionally or alternatively, the first element 220 may be coupled to the bottom surface of the arm 215.

In these or other embodiments, the second element 225 may be positioned adjacent the arm 215 and adjacent the first element 220. Additionally or alternatively, the second element 225 may not be coupled to the arm 215 and may be independent of the arm 215. For example, the arm 215 and the first element 220 may be spatially separated from the second element 225 as illustrated in FIG. 2B.

Figure 2B:
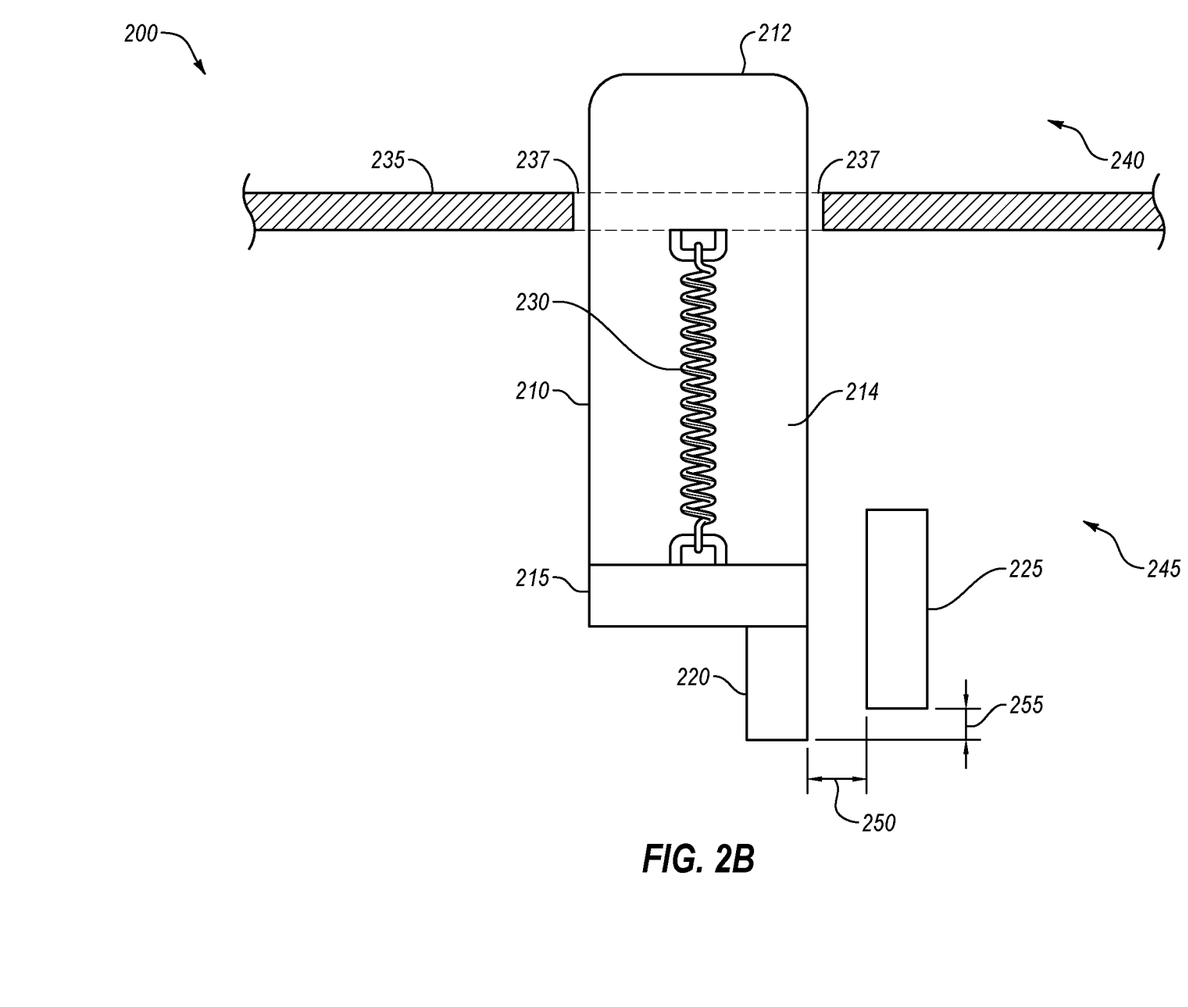
FIG. 2B illustrates another view of the example plunger of FIG. 2A.

FIG. 2B illustrates another view of the plunger 202 of FIG. 2A in the environment 200. For example, FIG. 2B illustrates another spatial relationship between the first element 220, the arm 215, and the second element 225. For example, in some embodiments, the second element 225 may be fixed relative to the housing 235 and/or independent of the arm 215 and the first element 220. Additionally or alternatively, a depth of the arm 215 and other elements may be illustrated.

Also illustrated in FIG. 2B is a lateral proximity 250 and a displacement proximity 255. In these or other embodiments, a spatial relationship between the first element 220 and the second element 225 may be defined, at least in part, by the lateral proximity 250 and the displacement proximity 255. In some embodiments, the lateral proximity 250 may be based on a position where the first element 220 may be attached to the arm 215 relative to the depth of the arm 215. For example, if the first element 220 is flush with a first edge of the arm 215, the lateral proximity 250 may be less than if the first element 220 is not positioned at the first edge. For example, the first element 220 may be positioned along the depth of the arm 215 between the first edge and a second edge, which may result in a greater lateral proximity 250 than if the first element 220 were flush with the first edge. In these or other embodiments, the displacement proximity 255 may be based on a function of the movement of the plunger 202, including the arm 215. For example, as the arm 215 may move, the displacement proximity 255 may increase or decrease depending on a fixed position of the second element 225 and a direction of movement of the arm 215 relative to the fixed position of the second element 225.

With reference to FIG. 2A, the spring element 230 may be coupled at either the top surface of the arm 215 or the bottom surface of the arm 215. The configuration of the spring element 230 may be based on whether the spring element 230 is a tension element or a compression element. Additionally or alternatively, the configuration of the spring element 230 may be based on how the spring element 230 is attached to the housing 235 to thereby, in some embodiments, counter an imposed force against the body 210 of the plunger 202. In these or other embodiments, the spring element 230 may be positioned in alignment with the pivot 205, the body 210, the arm 215, and the first element 220.

In these or other embodiments, the spring element 230 may be either a tension element or a compression element. For example, the spring element 230 may be a helical spring, a conical spring, a volute spring, a torsion spring, a leaf spring, a disc spring, or any other type of spring. Additionally or alternatively, the spring element 230 may be made of metal, plastic, laminates, or metal, among other materials, including for example, high carbon spring wire, carbon and alloy wire, hard drawn wire, alloy steel wire, stainless steel wire, non-ferrous alloy wire, high temperature alloy wire, and/or special purpose alloy wire.

In some embodiments, the plunger 202 may move in and out of the housing 235 in response to a force imposed on the first portion 212. Additionally or alternatively, the first portion 212 of the body 210 may be positioned in the external environment 240 in response to no force imposed on the first portion 212. In these or other embodiments, the first portion 212 being in the external environment 240 may be a home position or return position for the plunger 202 such that the plunger 202 may be configured to reset its position to the home position or the return position when the plunger 202 is not depressed. In the home position, the communication console may be in an off-hook state. In other embodiments, in response to the plunger 202 being depressed, the majority or all of the first portion 212 of the body 210 may resultantly be in the internal environment 245. In the depressed position, the communication console may be in an on-hook state.

In some embodiments, movement of the plunger 202 may be a function of at least the pivot 205 and/or the spring element 230. For example, the pivot 205 may include a rotatable element such that the pivot 205 may rotate about a center portion of the pivot 205. For example, the center portion of the pivot 205 may include an axis of rotation about which the pivot 205, and in turn the plunger 202, may move. In these or other embodiments, the pivot 205 may include a pin-hinge, a ball and socket joint, or some other joint allowing rotary or other movement. Additionally or alternatively, the pivot 205 may include various material types and components with various material properties, which in some embodiments, may help provide for movement of the pivot 205. For example, the pivot 205 may be made of plastic, metal, or other material, including certain tolerances, bearings, surface treatments, and/or surface finishing to help provide for movement and/or help reduce friction at the pivot 205.

Additionally or alternatively, movement at the pivot 205 may be caused by one or more elements. For example, in response to a handset being placed onto the communication console, the body 210 may be depressed into the internal environment 245 such that the pivot 205 may, in turn, rotate. Thus, in some embodiments, a weight of the handset, or some other source of force such as an object or a human finger, may provide a sufficient amount of force to initiate rotation of the pivot 205. In these or other embodiments, rotation of the pivot 205 may result in movement of other elements of the plunger 202, including elements described in further detail below such as the arm 215 and the first element 220 coupled to the arm 215.

In these or other embodiments, the spring element 230 may also provide a sufficient amount of force to initiate rotation of the pivot 205. For example, the spring element 230 may be in tension or compression based on how the spring element 230 is attached to the plunger 202. Whether in tension or compression, the spring element 230 may counter or oppose, in part, a force imposed on the body 210, for example, the weight of the handset when on the communication console. In these or other embodiments, in response to the handset being removed from the body 210, the spring element 230 may return the plunger 202 to a home position via moving the arm 215 to which the spring element 230 may be attached. Based on the spring element 230, depressed portions of the body 210, including the first portion 212 may also return to the external environment 240.

In some embodiments, the arm 215 may move in response to movement of the plunger 202 into the housing 235. In these or other embodiments, the first element 220 may also move with the arm 215 in response to movement of the plunger 202. Additionally or alternatively, each of the arm 215, the first element 220, the body 210, and the pivot 205 may move in response to the spring element 230 causing a return movement of the plunger 202, for example, in response to the imposed force on the first portion 212 being removed.

In some embodiments, the first element 220 may be a detectable element and the second element 225 a sensing element. For example, the second element 225, as the sensing element, may determine a spatial position of the first element 220, as the detectable element, relative to the second element 225. In these or other embodiments, the detectable element may include a magnet, and the sensing element may include a hall sensor. Alternatively or additionally, the detectable element may be another element for which a spatial location may be detected by a corresponding sensing element.

In some embodiments, the sensing element may include a sensory detection zone through which the detectable element may pass. Within the sensory detection zone, the sensing element may output a signal, specifically that the detectable element may be within the sensory detection zone. For example, the detectable element may move according to the arm 215 such that the detectable element may move from a first position in the sensory detection zone to a second position within the sensory detection zone. In either the first position or the second position, the sensing element may output that the detectable element is within the sensory detection zone. When the sensing element outputs the signal that the detectable element is within the sensory detection zone, a status of the communication console may be determined as on-hook. For example, the plunger 202 may be depressed enough such that the communication console may determine that the communication console is available to receive calls, is in an inactive state, a waiting state, a resting state, a sleep state, or an unused state.

Additionally or alternatively, the sensing element may also output a signal in response to the detectable element being positioned beyond the sensory detection zone of the sensing element. For example, in response to the detectable element being positioned at a third position beyond the sensory detection zone due to movement of the detectable element on the arm 215. When the sensing element outputs the signal that the detectable element is without the sensory detection zone, a status of the communication console may be determined as off-hook. For example, the plunger 202 may not be depressed sufficiently such that the communication console may determine that the communication console is unavailable to receive calls, is in an active state, a non-waiting state, a non-resting state, a non-sleep state, or an in-use state.

In some embodiments, the second element 225 may be coupled to the arm 215 and the first element 220 positioned adjacent the arm 215. For example, the sensing element may move with the arm 215 and may detect a position of the arm 215 via detecting the detectable element, which may be fixed relative to the sensing element. In these and other embodiments, the sensing element and the detectable element may function as described above. For example, when the sensing element outputs the signal that the detectable element is without the sensory detection zone, a status of the communication console may be determined as off-hook. Additionally, when the sensing element outputs the signal that the detectable element is within the sensory detection zone, a status of the communication console may be determined as on-hook.

Alternatively or additionally, in some embodiments, the first element 220 and the second element 225 may be arranged spatially such that when the sensing element outputs the signal that the detectable element is without the sensory detection zone, a status of the communication console may be determined as on-hook. Additionally, when the sensing element outputs the signal that the detectable element is within the sensory detection zone, a status of the communication console may be determined as off-hook In some embodiments, slight or incidental movement of the plunger 202 may not have an impactful effect on the status of the communication console. For example, a bump of a desk whereupon the communication console is positioned may not change the status of the communication console. Additionally or alternatively, movement of the handset or repositioning of the communication console may not change the status of the communication console. Additionally or alternatively, the communication console may be mounted at various angles relative to the force of gravity, and the status of the communication console may not resultantly change and/or lose responsiveness, reliability, or functionality. Each of the above examples may be a result of the plunger 202 as described in this disclosure. For example, movement of the plunger 202 may occur, and the second element 225 may sense that the first element 220 is still within the sensory detection zone. As a result, minor movements of the plunger 202, which may have resulted in a change of status in known communication consoles, may not result in a status change of the communication console described in this disclosure.

Figure 3:
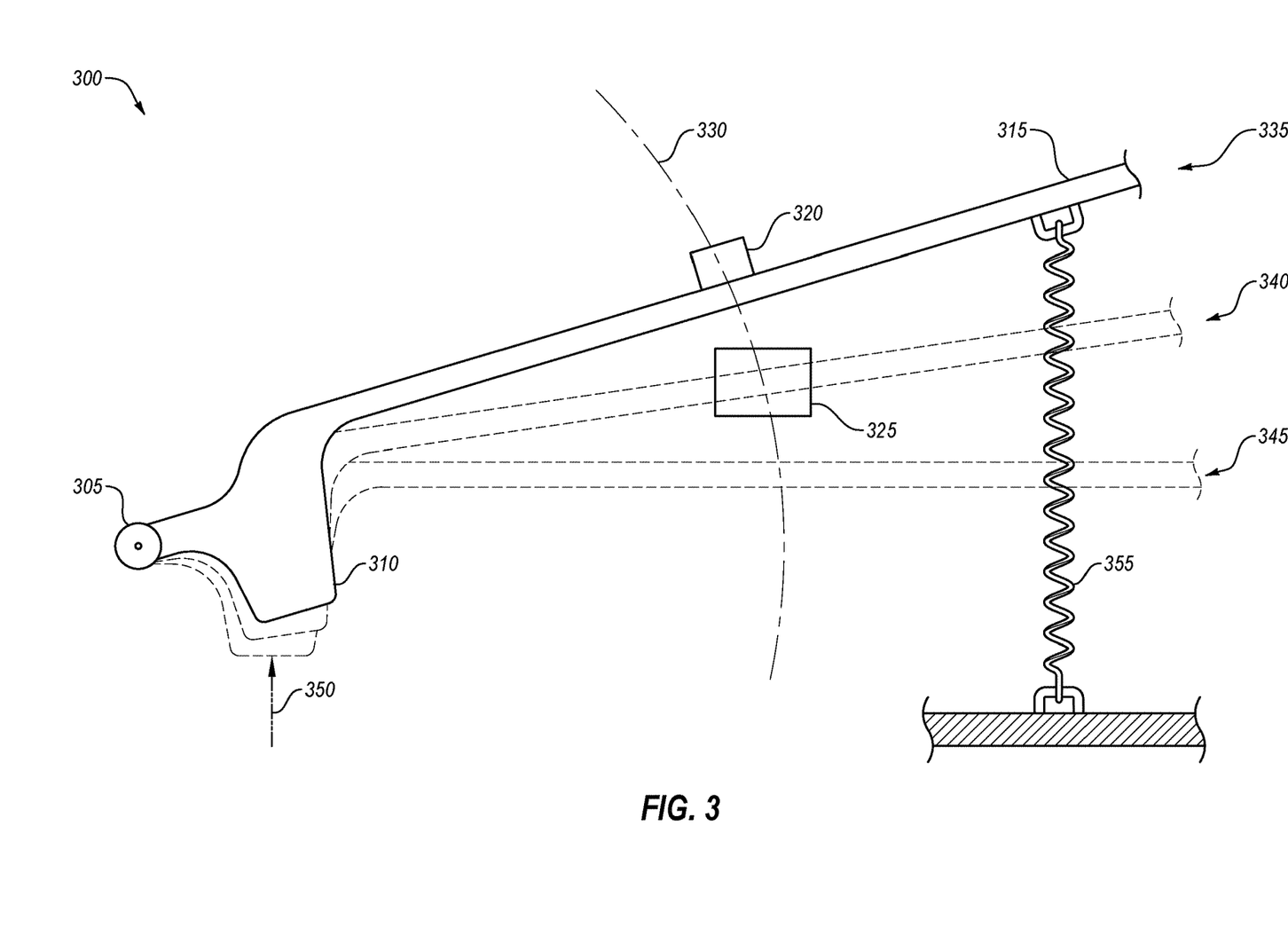
FIG. 3 illustrates example movement of an example plunger.

FIG. 3 illustrates example movement of an example plunger 300. The plunger 300 may be arranged in accordance with at least one embodiment described in the present disclosure. As illustrated, the plunger 300 in FIG. 3 includes a pivot 305, a body 310, and an arm 315. Also illustrated in FIG. 3 is a first element 320, a second element 325, an axis of displacement 330, a first position 335, a second position 340, a third position 345, a force 350, and a spring element 355. In these or other embodiments, a positional relationship between the first element 320 and the second element 325 may be defined, at least in part, by a position of the first element 320 along the axis of displacement 330, which may include the first position 335, the second position 340, and the third position 345. In these or other embodiments, the pivot 305, the body 310, the arm 315, the first element 320, the second element 325, and the spring element 355 may be the same as or similar to the corresponding elements described with respect to FIGS. 2A-2B.

In some embodiments, the axis of displacement 330 may define a movement path for the first element 320. For example, as the arm 315 may move the first element 320 to and from various positions such as the first position 335, the second position 340, the third position 345, or others position, the first element 320 may travel along the axis of displacement 330. Thus, in some embodiments, the first element 320 may travel along the axis of displacement 330 due to the spring element 355 and/or the force 350. In these or other embodiments, the force 350 may include a weight of a handset of a communication console, or some other source of force such as an object or a human finger.

In some embodiments, the axis of displacement 330 passes through the first element 320. Additionally or alternatively, the second element 325 may be positioned adjacent the axis of displacement 330 such that the second element 325 may be spatially offset from the arm 315 and the first element 320. In these or other embodiments, the second element 325 may also be aligned or substantially aligned with the axis of displacement 330.

In some embodiments, the second element 325 may be positioned adjacent to and in alignment with the axis of displacement 330 at a certain position relative to the plunger 300. The certain position may be based on the second element 325 being able to accurately and adequately sense the first element 320 in order for the status of the communication console to be properly determined. For example, if the second element 325 is configured to sense the first element 320 when the plunger 300 is depressed by the force 350, the second element 325 or first element 320 should be positioned such that the second element 325 senses the first element 320 when the plunger 300 is in the first position 335 and the second position 340. In these and other embodiments, when the plunger 300 is not depressed by the force 350, the second element 325 or the first element 320 should be positioned such that the second element 325 may not sense the first element 320 when the plunger 300 is in the third position 345. The positioning of the first element 320 may be adjusted by offsetting the location of the first element 320 from the arm 315. In these and other embodiments, the first element 320 may be coupled to but not in direct contact with the arm 315. Alternatively or additionally, the positioning of the second element 325 may be adjusted by locating the second element 325 at different positions within a housing that includes the plunger 300.

In other embodiments, the first element 320 and the second element 325 may be positionally switched such that the second element 325 may be coupled to the arm 315 and may travel the axis of displacement 330. Additionally or alternatively, the first element 320 may be positioned adjacent the axis of displacement 330 and may be spatially offset from the arm 315 and the second element 325. How the axis of displacement 330 may be defined relative to a specific geometry of either the first element 320 or the second element 325 may be further illustrated in conjunction with FIGS. 4A-4B.

Figure 4A:
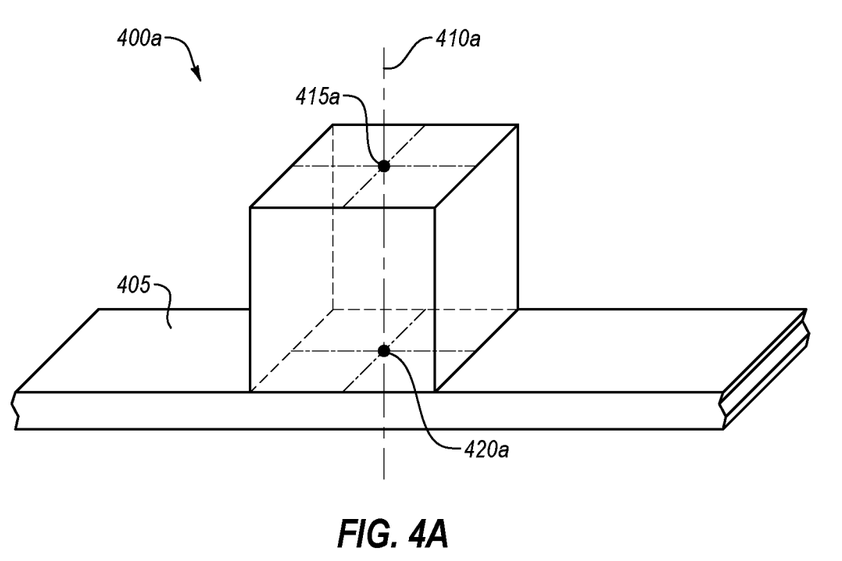
FIG. 4A illustrates an example first element coupled to an arm of a plunger.

FIG. 4A illustrates an example first element 400a coupled to an arm 405 of a plunger. The first element 400a may be arranged in accordance with at least one embodiment described in the present disclosure. As illustrated, FIG. 4A includes an axis of displacement 410a, a top point 415a, and a bottom point 420a. In these or other embodiments, movement of the first element 400a along the axis of displacement 410a may be defined, at least in part, by the top point 415a and the bottom point 420a.

In some embodiments, the top point 415a may be positioned in a center portion of a top surface of the first element 400a. Alternatively or additionally, the top point 415a may be positioned anywhere along the top surface of the first element 400a. The top surface may not be in direct contact with the arm 405. Additionally or alternatively, the top surface may be positioned parallel or substantially parallel to the arm 405.

In some embodiments, the bottom point 420a may be positioned in a center portion of a bottom surface of the first element 400a. Alternatively or additionally, the bottom point 420a may be positioned in anywhere along the bottom surface of the first element 400a. The bottom surface may be positioned parallel or substantially parallel to the arm 405. In some embodiments, the bottom surface may be in direct contact with the arm 405. Alternatively or additionally, the bottom surface may not be in direct contact with the arm 405. In these and other embodiments, the bottom surface of the first element 400a may be offset from the arm 405 by an offset distance. In some embodiments, the axis of displacement 410a may be defined by the top point 415a and the bottom point 420a such that the axis of displacement 410a may pass through both of the top point 415a and the bottom point 420a. In these or other embodiments, as the arm 405 moves, the first element 400a may move along the axis of displacement 410a. The first element 400a may also include various geometries that define the axis of displacement 410a as described in conjunction with FIG. 4B.

Figure 4B:
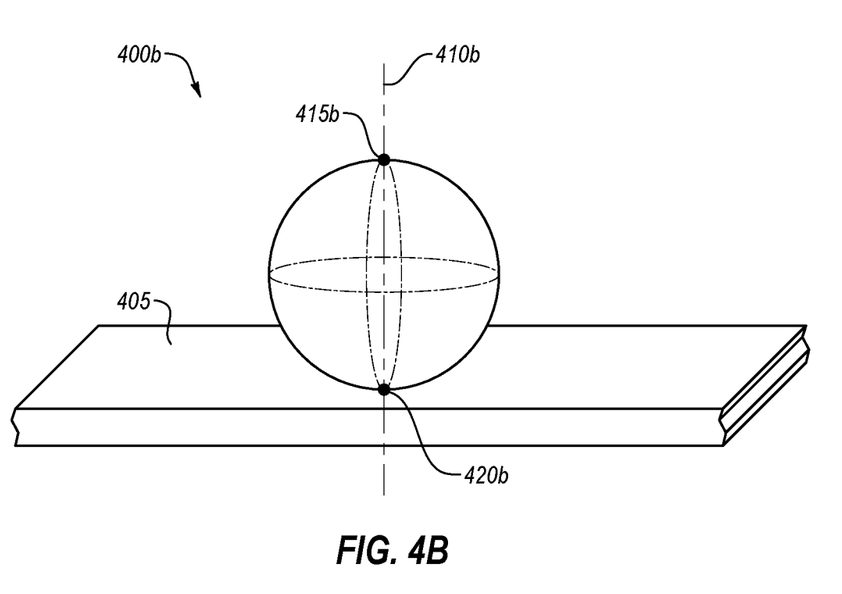
FIG. 4B illustrates another example first element coupled to an arm of a plunger.

FIG. 4B illustrates an example first element 400b coupled to the arm 405 of the plunger. The first element 400b may be arranged in accordance with at least one embodiment described in the present disclosure. As illustrated, FIG. 4B includes an axis of displacement 410b, a top point 415b, and a bottom point 420b. In these or other embodiments, movement of the first element 400b along the axis of displacement 410b may be defined, at least in part, by the top point 415b and the bottom point 420b.

In some embodiments, the top point 415b may be positioned at a first geometric pole and/or in a portion of a top surface of the first element 400b. The top surface may not be in direct contact with the arm 405. Additionally or alternatively, the top surface may be a tangential plane positioned parallel or substantially parallel to the arm 405.

In some embodiments, the bottom point 420b may be positioned at a second geometric pole opposite the first geometric pole. Additionally or alternatively, the bottom point 420b may be positioned in a portion of a bottom surface of the first element 400b. The bottom surface may be a tangential plane positioned parallel or substantially parallel to the arm 405. In some embodiments, the bottom surface may be in direct contact with the arm 405. Alternatively or additionally, the bottom surface may not be in direct contact with the arm 405.

In some embodiments, the axis of displacement 410b may be defined by the top point 415b and the bottom point 420b such that the axis of displacement 410b may pass through both of the top point 415b and the bottom point 420b. In these or other embodiments, as the arm 405 moves, the first element 400b may move along the axis of displacement 410b. Movement of the arm 405, and in turn, movement of the first element 400a/400b along the axis of displacement 410a/410b may result from various elements and/or configurations of the various elements as described in this disclosure.

Figure 5:
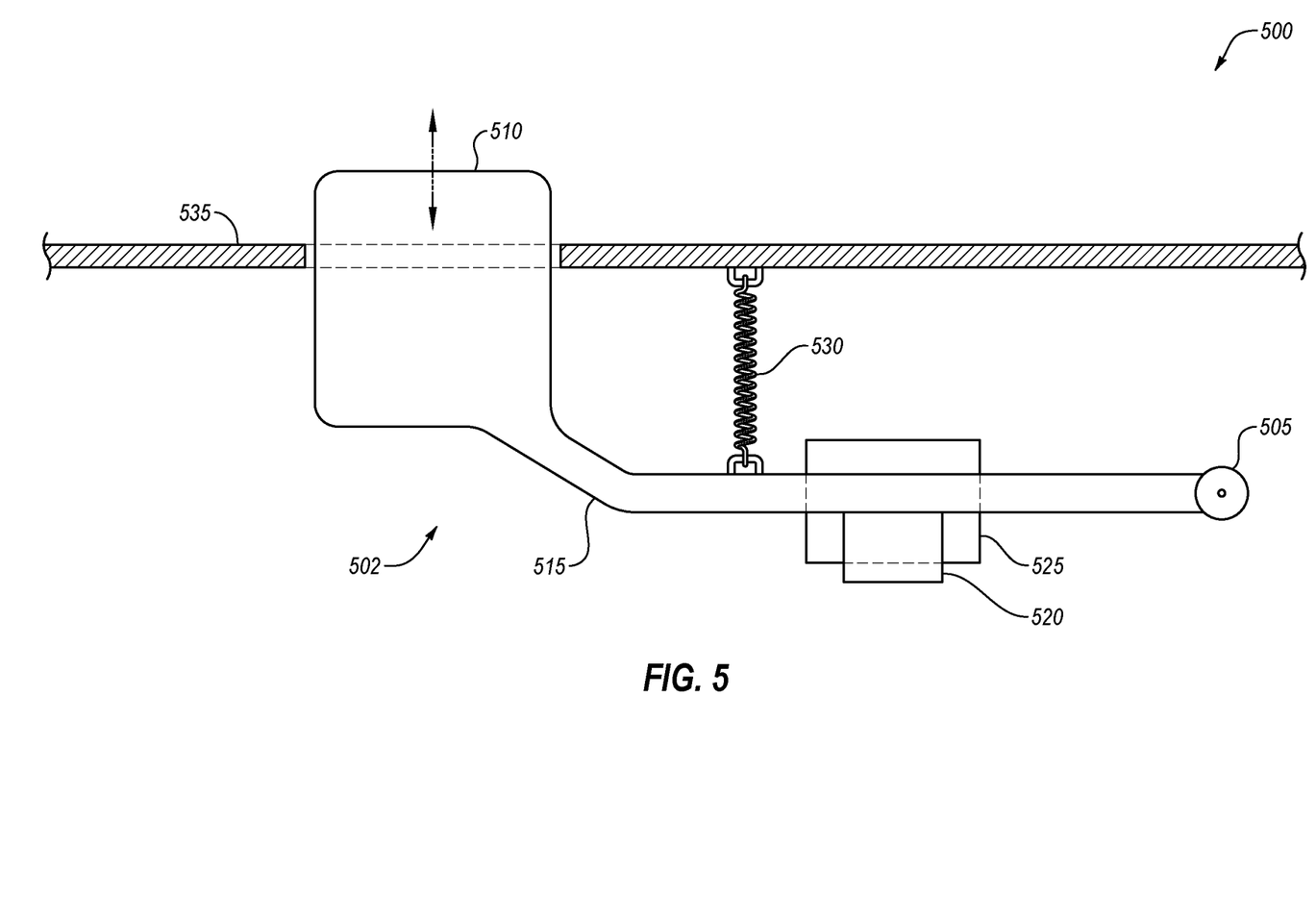
FIG. 5 illustrates another example plunger.

FIG. 5 illustrates an environment 500 that includes another example plunger 502. The plunger 502 may be arranged in accordance with at least one embodiment described in the present disclosure. As illustrated, the plunger 502 includes a pivot 505, a body 510, and an arm 515, each of which may be analogous to corresponding elements described in conjunction with FIGS. 2A, 2B, and 3. Also illustrated in FIG. 5 is a first element 520, a second element 525, a spring element 530, and a housing 535, each of which may be analogous to corresponding elements described in conjunction with FIGS. 2A, 2B, and 3. In these or other embodiments, various elements may be positioned relative to and/or attached at various locations along the arm 515 such that the body 510 may move in and out of the housing 535 and also such that the first element 520 may move relative to the second element 525.

As illustrated in FIG. 5, the pivot 505 may be positioned at a first end of the arm 515, and the body 510 positioned at a second end of the arm 515 opposite the first end. The first end and the second end may be aligned or substantially aligned relative to each other. Additionally or alternatively, the first element 520 may be positioned adjacent the pivot 505 and may also be coupled to and aligned with the arm 515. Additionally or alternatively, the second element 525 may be positioned adjacent the arm 515 and the first element 520. Additionally or alternatively, the spring element 530 may be coupled to either the top surface of the arm 515 or the bottom surface of the arm 515 between the body 510 and the first element 520. In these or other embodiments, the body 510 may be coupled to the arm 515 at the second end opposite the pivot 505.

In other embodiments, various elements mentioned with respect to FIG. 5 may be included in the plunger 502 in other variations. For example, relative to the pivot 505, various elements, such as the body 510, the first element 520, and the spring element 530, may be included in the plunger 502 in various configurations other than those illustrated.

In these or other embodiments, the second element 525 may be positionally switched with the first element 520 such that the same or similar function of the plunger 502 may be implemented. For example, the various variations of the pivot 505, the body 510, the first element 520, the second element 525, and the spring element 530 may, in some embodiments, be based on desired sensitivity levels or other factors that may affect a responsiveness, reliability, and/or functionality of the plunger 502. Thus, in some embodiments, irrespective of the various variations of the aforementioned elements, the plunger 502 may be part of a method of operations within a communication console to help determine a status of the communication console.

Figure 6:
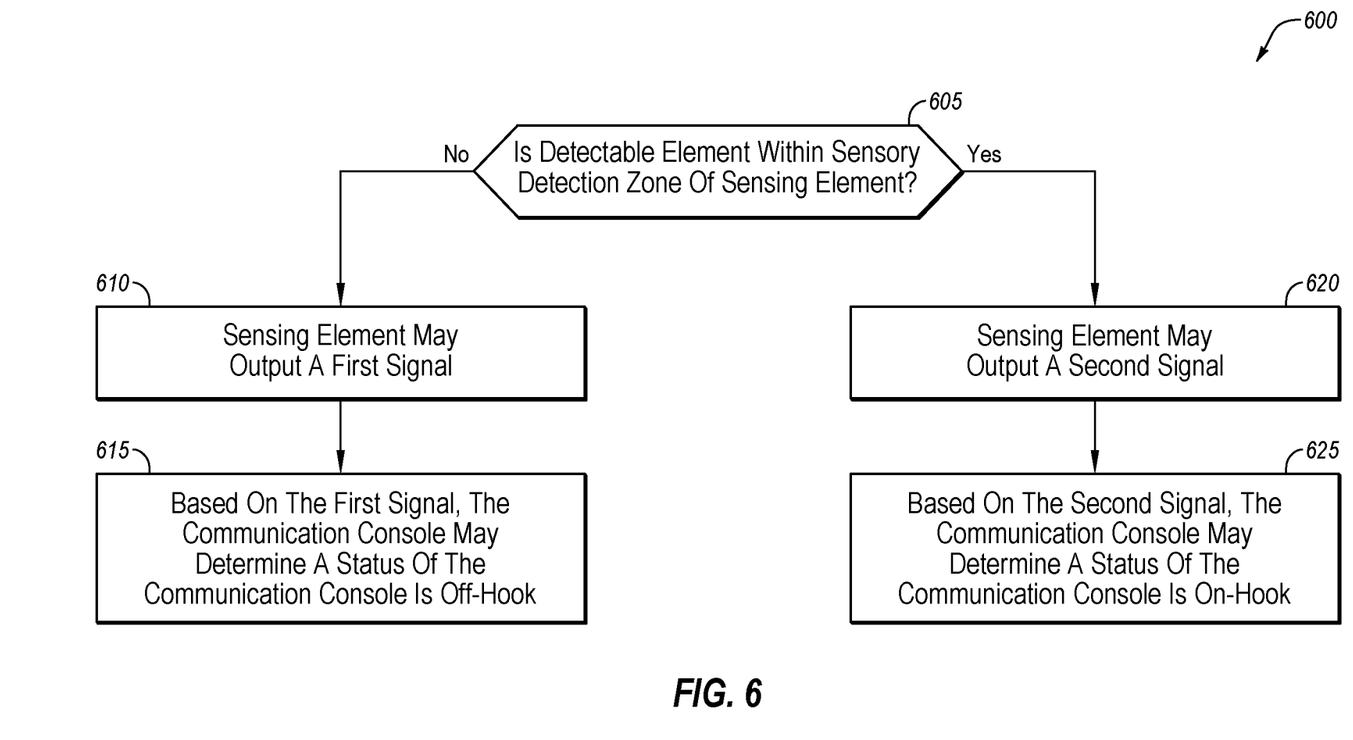
FIG. 6 is a flow diagram of an example operation of a handset sensor system in a communication console.

FIG. 6 illustrates a flow diagram of an example method 600 to determine a status of a communication console. The method 600 may be arranged in accordance with at least one embodiment described in the present disclosure. The method 600 may be performed, in whole or in part, in some embodiments by a communication console system, such as the communication console 100, and/or a processing system as described with respect to FIG. 1. In these and other embodiments, some or all of the steps of the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 605, where it may be determined if a detectable element is within a sensory detection zone of a sensing element. In some embodiments, the detectable element may be a magnet, and the sensing element may be a hall effect sensor. When the detectable element is within the sensory detection zone, the method 600 may proceed to block 620. When the detectable element is not within the sensory detection zone, the method 600 may proceed to block 610.

In block 610, a first signal may be output by the sensing element. In some embodiments, the first signal may indicate that the detectable element is not within the sensory detection zone of the sensing element. The first signal may be directed to the communication console. For example, the first signal may be directed to a processor of the communication console.

In block 615, a status of the communication console may be determined to be off-hook based on the first signal. The status may be determined by the communication console.

In block 620, a second signal may be output by the sensing element. In some embodiments, the second signal may indicate that the detectable element is within the sensory detection zone of the sensing element. The second signal may be directed to the communication console. For example, the second signal may be directed to the processor of the communication console.

In block 625, a status of the communication console may be determined to be on-hook based on the second signal. The status may be determined by the communication console.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 7:
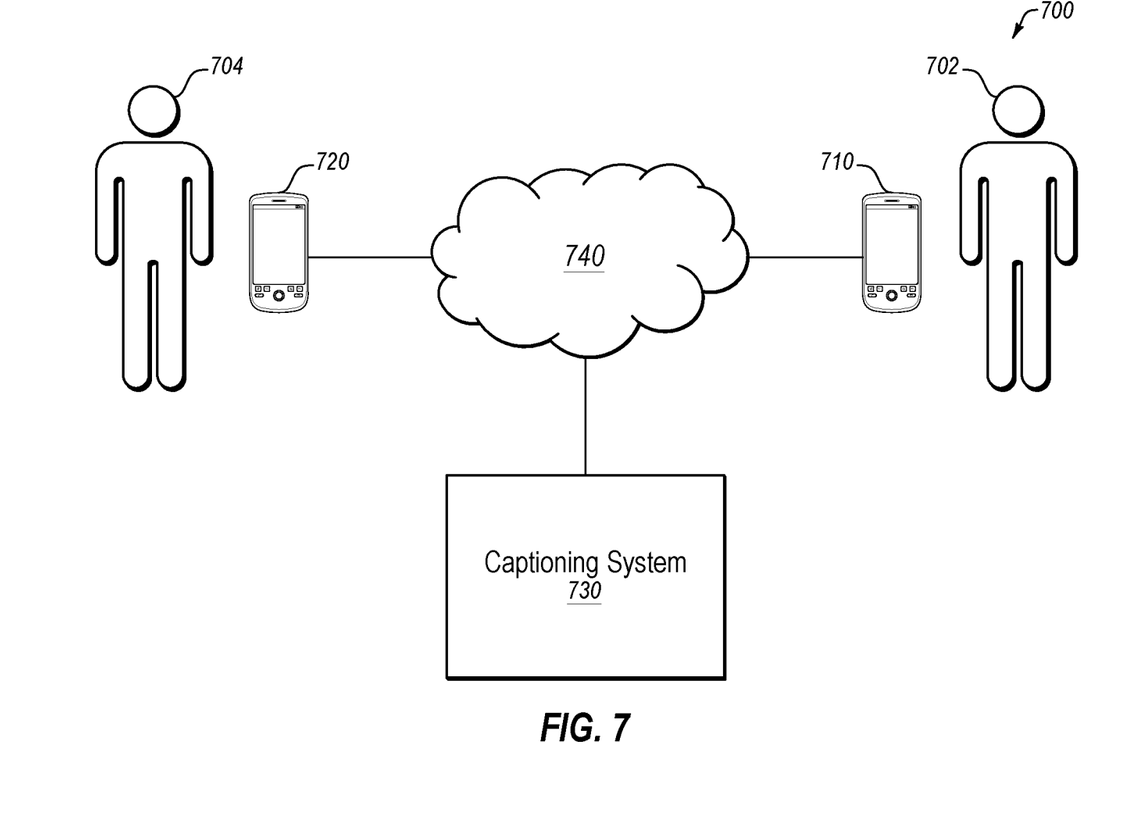
FIG. 7 illustrates an example communication system that may include a communication console.

FIG. 7 illustrates an example communication system 700 that may include a communication device configured to adjust audio amplification of output audio. The communication system 700 may be arranged in accordance with at least one embodiment described in the present disclosure.

The communication system 700 may include a first device 710, a second device 720, and a system 730. The first device 710 and/or the second device 720 may be examples of the communication console 100 of FIG. 1. Thus, FIG. 7 illustrates an environment or system that may use the communication console 100 of FIG. 1.

The first device 710 and the system 730 may be communicatively coupled by a network 740. Alternately or additionally, the first device 710 and the second device 720 may be communicatively coupled by the network 740. In some embodiments, the network 740 may be any network or configuration of networks configured to send and receive communications between systems and devices. In some embodiments, the network 740 may include a conventional type network, a wired or wireless network, and may have numerous different configurations. In some embodiments, the network 740 may also be coupled to or may include portions of a telecommunications network, including telephone lines, for sending data in a variety of different communication protocols, such as a plain old telephone system (POTS).

In some embodiments, the communication system 700 illustrated may be configured to facilitate an assisted call between a hearing-impaired user 702 and a second user 704. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

Alternatively or additionally, the communication system 700 illustrated may be configured to facilitate a call between a person with medical expertise and/or experience and the hearing-impaired user 702. As used in the present disclosure, a "person with medical expertise and/or experience" may be a nurse, doctor, or some other trained medical professional.

In some embodiments, a communication session, such as an audio or a video communication session, may be established between the first device 710 and the second device 720. In one example embodiment, the communication session may be a captioning communication session.

In some embodiments, the system 730 may be an assistive service, which is intended to permit a hearing-impaired person to utilize a communication network and assist their understanding of a conversation by providing text captions to supplement voice conversation occurring during communication sessions with other devices, such as the second device 720. Alternatively or additionally, the system 730 may be an assistive service to couple a person with medical expertise and/or experience with a person requesting medical assistance.

During a communication session, the system 730 and the first device 710 may be communicatively coupled using networking protocols. In some embodiments, during the communication session between the first device 710 and the second device 720, the first device 710 may provide the audio signal from the second device 720 to the system 730.

In some embodiments, at the system 730, a call assistant may listen to the audio signal of the second user 704 and "revoice" the words of the second user 704 to a speech recognition computer program tuned to the voice of the call assistant. In these and other embodiments, the call assistant may be an operator who serves as a human intermediary between the hearing-impaired user 702 and the second user 704. In some embodiments, text captions may be generated by the speech recognition computer as a transcription of the audio signal of the second user 704. The text captions may be provided to the first device 710 being used by the hearing-impaired user 702 over the network 740. The first device 710 or another device may display the text captions while the hearing-impaired user 702 carries on a normal conversation with the second user 704. The text captions may allow the hearing-impaired user 702 to supplement the voice signal received from the second device 720 and confirm his or her understanding of the words spoken by the second user 704.

Modifications, additions, or omissions may be made to the communication system 700 without departing from the scope of the present disclosure. For example, in some embodiments, the second user 704 may be hearing impaired. In these and other embodiments, the system 730 may provide text captions to the second device 720 based on audio data transmitted by the first device 710. Alternately or additionally, the system 730 may include additional functionality. For example, the system 730 may edit the text captions or make other alterations to the text captions after presentation of the text captions on the first device 710.

As indicated above, the embodiments described herein may include the use of a special purpose or general purpose computer (e.g., a processor element) including various computer hardware or software modules, as discussed in greater detail below. Further, as indicated above, embodiments described herein may be implemented using computer-readable media (e.g., a memory element) for carrying or having computer-executable instructions or data structures stored thereon.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A communication console comprising:
   a moveable plunger including a body and an arm, the arm connected to and extending away from the body;
   a first element physically coupled to the arm, the first element having a top point on a top surface of the first element, a bottom point on an opposing bottom surface of the first element, and an axis of displacement extending between the top point and the bottom point, the first element configured to move with the arm along the axis of displacement;
   a second element physically detached from the arm and positioned adjacent to the axis of displacement, wherein one of the first element or the second element is a sensing element and another is a detectable element, the sensing element configured to sense a spatial position of the detectable element and output an indication of a position of the plunger based on the spatial position of the detectable element; and
   a housing that encases the first element, the second element, and the arm, the housing including an opening, the body of the plunger positioned in the opening and configured to move through the opening of the housing, the movement of the body through the opening resulting in movement of the first element along the axis of displacement.

2. The communication console of claim 1, further comprising a handset, wherein the body is configured to contact the handset such that placement of the handset on the communication console causes movement of the body through the opening of the housing.

3. The communication console of claim 2, wherein the first element is the detectable element, and the second element is the sensing element.

4. The communication console of claim 3, wherein the detectable element is a magnet, and the sensing element is a hall effect sensor.

5. The communication console of claim 4, wherein
   the plunger further comprises a pivot joint positioned at a first end of the plunger,
   the communication console further comprises a spring element coupled to the arm at a second end of the plunger opposite the first end of the plunger, the spring element configured to supply mechanical energy to the plunger to cause the plunger to pivot about the pivot joint,
   the magnet is configured to move along the axis of displacement in response to movement of the plunger about the pivot joint, and
   the hall effect sensor is configured to reside at a fixed position within the housing and at a position adjacent the arm and between the pivot joint and the spring element.

6. The communication console of claim 1, wherein the plunger further comprises a pivot joint about which the plunger is configured to pivot, and the first element is configured to move with movement of the plunger along the axis of displacement.

7. The communication console of claim 6, further comprising a spring element coupled to the plunger and configured to supply mechanical energy to the plunger to cause the plunger to pivot about the pivot joint.

8. The communication console of claim 1, wherein the sensing element includes spatial parameters that define a sensor detection zone, the sensing element configured to output a first signal in response to the detectable element being within the sensor detection zone and a second signal in response to the detectable element being without the sensor detection zone.

9. The communication console of claim 8, further comprising a handset configured to interact with the body of the plunger, wherein one of the first signal and the second signal indicates that the handset is contacting the body of the plunger such that the communication console is in an on-hook state and another of the first signal and the second signal indicates the communication console is in an off-hook state.

10. A communication console comprising:
a housing including an opening;
a moveable plunger including:
    a body including a portion configured to move through the opening in the housing; and
    an arm including:
        a first end pivotally connected to the house; and
        a second end connected to and extending away from the body, an entirety of the arm positioned within the housing;
a first element physically coupled to the arm at a position inside the housing such that the first element moves with the arm inside the housing and the movement of the body through the opening resulting in movement of the arm and the first element; and
a second element positioned inside the housing and adjacent to the arm,
wherein one of the first element or the second element is a sensing element and another is a detectable element, the sensing element configured to sense a spatial position of the detectable element and output an indication of a position of the plunger based on the spatial position of the detectable element.

11. The communication console of claim 10, wherein the plunger further comprises a pivot joint, and the first element is configured to move with the arm in response to the plunger being configured to pivot about the pivot joint.

12. The communication console of claim 11, further comprising a spring element coupled to the plunger and configured to supply mechanical energy to the plunger to cause the plunger to pivot about the pivot joint.

13. The communication console of claim 10, wherein the first element is the detectable element, and the second element is the sensing element.

14. The communication console of claim 13, wherein the detectable element is a magnet, and the sensing element is a hall effect sensor.

15. The communication console of claim 14, wherein
the plunger further comprises a pivot joint positioned at a first end of the plunger,
the communication console further comprises a spring element coupled to the arm at a second end of the plunger opposite the first end of the plunger, the spring element configured to supply mechanical energy to the plunger to cause the plunger to pivot about the pivot joint,
the magnet is configured to move in response to movement of the plunger about the pivot joint, and
the hall effect sensor is configured to reside at a fixed position within the housing and at a position adjacent the arm and between the pivot joint and the spring element.

* * * * *